United States Patent
Ringwald et al.

(10) Patent No.: US 9,593,766 B2
(45) Date of Patent: *Mar. 14, 2017

(54) SYSTEM AND METHOD FOR SYNCHRONIZING ENGINE AND TRANSMISSION SYSTEM OPERATION WITHIN AN AGRICULTURAL VEHICLE

(71) Applicant: CNH Industrial America LLC, New Holland, PA (US)

(72) Inventors: Justin Ringwald, Ellinwood, KS (US); Rex LeRoy Ruppert, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,657

(22) Filed: Aug. 8, 2014

(65) Prior Publication Data

US 2014/0343811 A1  Nov. 20, 2014

Related U.S. Application Data

(62) Division of application No. 13/097,302, filed on Apr. 29, 2011, now Pat. No. 8,801,572.

(51) Int. Cl.
| | |
|---|---|
| *B60W 10/06* | (2006.01) |
| *F16H 61/02* | (2006.01) |
| *F16H 63/50* | (2006.01) |
| *B60W 10/11* | (2012.01) |
| *B60W 30/19* | (2012.01) |

(Continued)

(52) U.S. Cl.
CPC ......... *F16H 61/0204* (2013.01); *B60K 31/00* (2013.01); *B60W 10/06* (2013.01); *B60W 10/11* (2013.01); *B60W 30/19* (2013.01); *F16H 61/68* (2013.01); *F16H 63/50* (2013.01); *B60K 2310/246* (2013.01); *B60K 2310/248* (2013.01); *B60W 2510/0638* (2013.01); *B60W 2510/1025* (2013.01); *B60W 2710/0644* (2013.01); *B60W 2710/0666* (2013.01); *B60W 2710/0672* (2013.01); *B60Y 2200/22* (2013.01);

(Continued)

(58) Field of Classification Search
None
See application file for complete search history.

(56) References Cited

U.S. PATENT DOCUMENTS

| | | | |
|---|---|---|---|
| 4,622,637 A | 11/1986 | Tomita et al. | |
| 5,658,217 A * | 8/1997 | Tsukada | B60W 10/101 477/109 |

(Continued)

*Primary Examiner* — Colby M Hansen
(74) *Attorney, Agent, or Firm* — Rebecca L. Henkel; Rickard K. DeMille (57) ABSTRACT

A system and method for controlling a transmission system is provided. One agricultural vehicle includes a vehicle controller configured to instruct an engine controller to maintain an engine at a constant speed and to receive a first signal from a transmission controller indicative of gear shift initiation. The vehicle controller is also configured to instruct the engine controller to maintain the engine at a current torque upon receipt of the first signal and to receive a second signal from the transmission controller indicative of gear shift completion. The vehicle controller is configured to instruct the engine controller to maintain the engine at the constant speed upon receipt of the second signal.

20 Claims, 5 Drawing Sheets

(51) Int. Cl.
*B60K 31/00* (2006.01)
*F16H 61/68* (2006.01)

(52) U.S. Cl.
CPC ........ *Y10T 477/675* (2015.01); *Y10T 477/676* (2015.01); *Y10T 477/677* (2015.01)

(56) References Cited

U.S. PATENT DOCUMENTS

| | | |
|---|---|---|
| 6,269,293 B1 | 7/2001 | Correa et al. |
| 6,428,448 B2 | 8/2002 | Saito et al. |
| 6,740,005 B2 | 5/2004 | Watanabe et al. |
| 7,294,092 B2 | 11/2007 | Walker et al. |
| 7,347,805 B2 | 3/2008 | Iriyama et al. |
| 7,393,305 B2 | 7/2008 | Yamada et al. |
| 7,549,946 B2 | 6/2009 | Ayabe et al. |
| 7,614,977 B2 | 11/2009 | Fujii et al. |
| 7,780,570 B2 | 8/2010 | Iwatsuki et al. |
| 7,908,065 B2 | 3/2011 | Kuwahara et al. |
| 2004/0014563 A1 | 1/2004 | Janasek et al. |
| 2008/0026910 A1 | 1/2008 | Honma et al. |
| 2008/0146412 A1 | 6/2008 | Sagawa et al. |
| 2008/0208422 A1 | 8/2008 | Shibata et al. |
| 2009/0082933 A1 | 3/2009 | Ikeda et al. |
| 2009/0291801 A1 | 11/2009 | Matsubara et al. |
| 2010/0262345 A1 | 10/2010 | Sawada et al. |

\* cited by examiner

SYSTEM AND METHOD FOR SYNCHRONIZING ENGINE AND TRANSMISSION SYSTEM OPERATION WITHIN AN AGRICULTURAL VEHICLE

CROSS REFERENCE TO RELATED APPLICATIONS

This application is a divisional of U.S. patent application Ser. No. 13/097,302, entitled "System and Method for Synchronizing Engine and Transmission System Operation within an Agricultural Vehicle", filed Apr. 29, 2011, which is herein incorporated by reference.

BACKGROUND

The invention relates generally to agricultural vehicles and, more particularly, to a system and method for synchronizing engine and transmission system operation within an agricultural vehicle.

Various types of agricultural vehicles (e.g., tractors, floaters, applicators, sprayers, etc.) are employed to deliver fertilizer, pesticides, herbicides, seeds, or other products to the surface of a field and/or to perform other agricultural functions (e.g., harvesting, cultivating, etc.). Typical agricultural vehicles include an engine configured to power the vehicle, and a transmission system configured to transfer engine power to rotating wheels at a desired gear ratio. Certain agricultural vehicles employ an automatic transmission configured to automatically shift gear ratios based on engine load, engine speed and/or ground speed, among other factors.

Certain agricultural vehicles include a cruise control system configured to maintain a constant vehicle speed by continuously regulating engine speed. For example, certain cruise control systems may maintain the engine at a desired speed (e.g., approximately 2100 rotations per minute (RPM)) to achieve a desired vehicle speed. During a gear shift, the ratio of engine speed to ground speed changes. Because the ground speed remains substantially constant, the engine speed is varied to facilitate gear shifting. However, many modern engines are effective at maintaining a constant engine speed when the cruise control system is engaged. Unfortunately, maintaining a constant engine speed while the transmission is shifting gears may interfere with the shifting process.

BRIEF DESCRIPTION

In one embodiment, an agricultural vehicle includes a vehicle controller configured to instruct an engine controller to maintain an engine at a constant speed and to receive a first signal from a transmission controller indicative of gear shift initiation. The vehicle controller is also configured to instruct the engine controller to maintain the engine at a current torque upon receipt of the first signal and to receive a second signal from the transmission controller indicative of gear shift completion. The vehicle controller is configured to instruct the engine controller to maintain the engine at the constant speed upon receipt of the second signal.

In another embodiment, a method for synchronizing engine and transmission system operation within an agricultural vehicle includes instructing an engine controller to maintain an engine at a constant speed and receiving a first signal from a transmission controller indicative of gear shift initiation. The method also includes instructing the engine controller to maintain the engine at a current torque upon receipt of the first signal and receiving a second signal from the transmission controller indicative of gear shift completion. The method includes instructing the engine controller to maintain the engine at the constant speed upon receipt of the second signal.

In another embodiment, a vehicle includes a transmission system configured to change gear ratios and a transmission controller communicatively coupled to the transmission system, and configured to control operation of the transmission system. The agricultural vehicle also includes an engine coupled to the transmission system and configured to transfer torque to the transmission system, and an engine controller communicatively coupled to the engine, and configured to control the operation of the engine. The agricultural vehicle includes a vehicle controller communicatively coupled to the transmission controller and to the engine controller. The vehicle controller is configured to instruct the engine controller to maintain the engine at a constant speed and to receive a first signal from the transmission controller indicative of gear shift initiation. The vehicle controller is also configured to instruct the engine controller to maintain the engine at a current torque upon receipt of the first signal and to receive a second signal from the transmission controller indicative of gear shift completion. The vehicle controller is configured to instruct the engine controller to maintain the engine at the constant speed upon receipt of the second signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
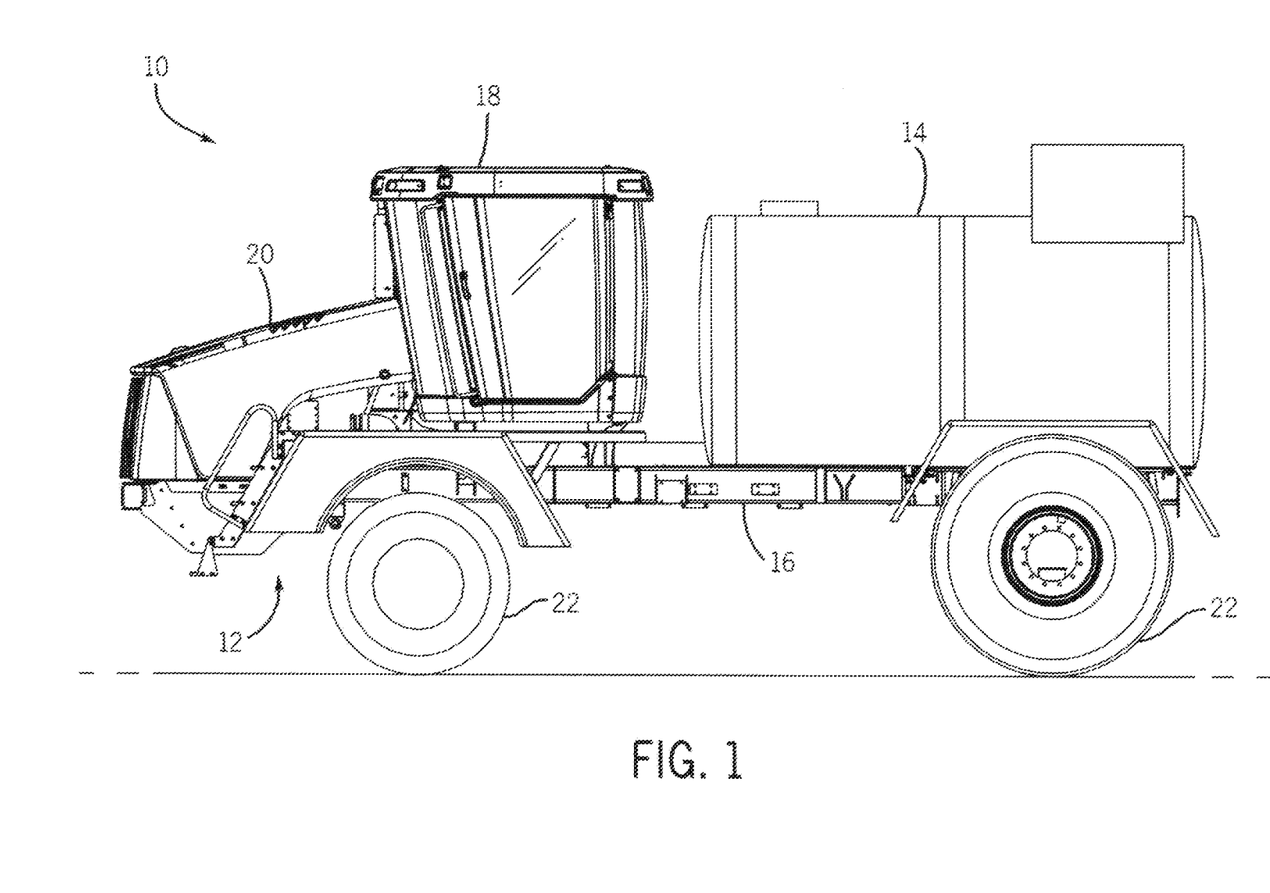
FIG. 1 is a perspective view of an embodiment of an agricultural vehicle that may employ a control system configured to synchronize engine and transmission system operation.

FIG. 1 is a perspective view of an embodiment of an agricultural vehicle 10 that employs a control system 12 configured to synchronize engine and transmission system operation. The agricultural vehicle 10 includes a tank 14 where material, such as fertilizer, pesticide, herbicide and/or other products, are stored for distribution to a field. As illustrated, the vehicle 10 also includes a frame 16, a cab 18, and a hood 20. The frame 16 provides structural support for the cab 18, the hood 20, and the tank 14. Furthermore, the cab 18 provides an enclosed space for an operator, and the hood 20 houses the engine and/or other systems configured to facilitate operation of the vehicle 10. The agricultural vehicle 10 also includes wheels 22 configured to support the frame 16, and to facilitate movement of the vehicle across the field.

As discussed in detail below, the engine is coupled to a transmission system configured to transfer torque from the engine to the wheels 22. In the present embodiment, the transmission system includes an automatic transmission configured to automatically shift gear ratios based on engine load, engine speed and/or ground speed, among other factors. The engine and transmission system are communicatively coupled to the control system 12, which may include various controllers and/or user interfaces configured to control operation of the engine and transmission system. For example, the control system 12 may include a transmission controller, an engine controller, and a vehicle controller. However, it should be appreciated that the engine control functionality, the transmission control functionality and/or the vehicle control functionality may be performed by a single controller in certain embodiments. The transmission control system 12 controls the operation and communication between various systems, such as between the transmission controller and the transmission system, or between the engine controller and the engine. As such, the transmission control system 12 enables the automatic transmission system of the floater 10 to shift gears, such as when the floater 10 is being operated via engine cruise control.

In certain embodiments, a vehicle controller may be configured to instruct an engine controller to maintain an engine at a constant speed except during a gear shifting process. During the gear shifting process, the vehicle controller may be configured to instruct the engine controller to maintain the engine at a current torque. To facilitate control timing, the vehicle controller receives signals from a transmission controller indicating initiation and termination of the gear shifting process. In such an embodiment, the temporary transition from the constant speed to the constant torque during the gear shifting process enables the transmission system to effectively change gears, thereby facilitating up shifts and/or down shifts. While the illustrated agricultural vehicle 10 is a floater, it should be appreciated that alternative vehicles, such as tractors, sprayers, and/or any type of vehicle, including agricultural and non-agricultural vehicles, may employ the control system 12 to synchronize operation of the engine and transmission system.

Figure 2:
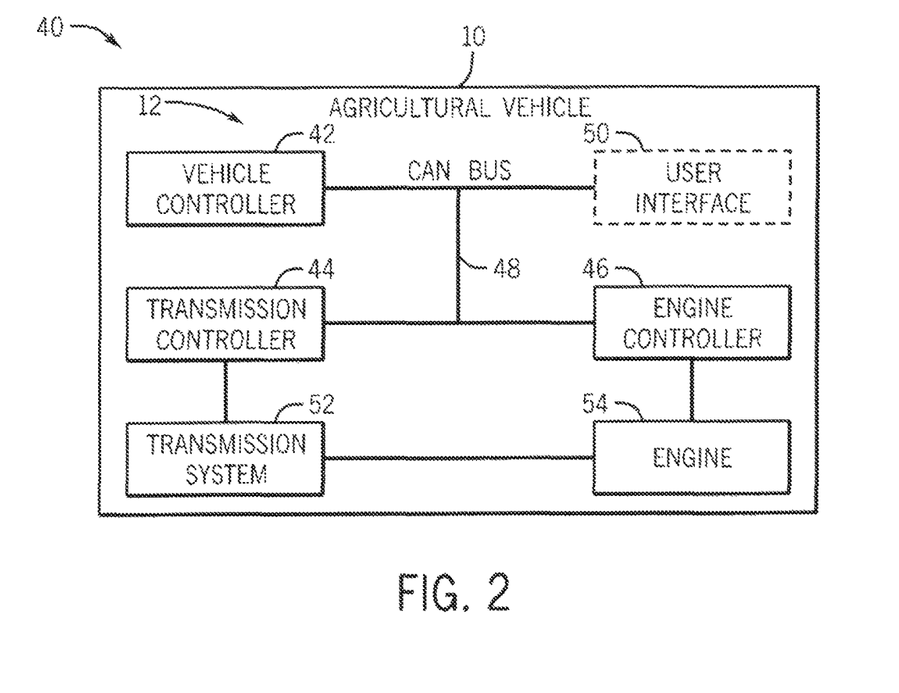
FIG. 2 is a schematic diagram of an embodiment of a control system that may be employed within the agricultural vehicle of FIG. 1.

FIG. 2 is a schematic diagram 40 of an embodiment of a control system 12 that may be employed within the agricultural vehicle 10 of FIG. 1. As illustrated, the control system 12 includes a vehicle controller 42, a transmission controller 44, and an engine controller 46. As will be appreciated, the controllers 42, 44, and 46 may each include one or more processors, memory devices, and/or storage devices. Furthermore, the controllers 42, 44, and 46 are communicatively coupled to one another via a communication bus, such as the illustrated CAN bus 48. In this configuration, the controllers 42, 44, and 46 function cooperatively to control operation of the engine and transmission system. In the illustrated embodiment, the controllers 42, 44 and 46 are communicatively coupled to a user interface 50 via the CAN bus 48. The user interface 50 enables an operator to provide input to the vehicle controller 42. For example, the user interface 50 may enable an operator to activate the cruise control, select an engine speed and/or adjust various parameters associated with engine/transmission system operation. Consequently, the user interface 50 may include various input controls and/or a display for presenting information to the operator. In certain embodiments, the controllers 42, 44, and 46, and the user interface 50 may be communicatively coupled to one another by any suitable wired or wireless communication system.

As illustrated, the transmission controller 44 is communicatively coupled to a transmission system 52, and configured to control operation of the transmission system 52. For example, the transmission controller 44 may instruct the transmission system 52 to shift gears (e.g., up shift or down shift) based on engine load, engine speed and/or ground speed, among other factors. Alternatively, the transmission controller 44 may monitor gear shifts automatically performed by the transmission system 52. In certain embodiments, the transmission system 52 includes an automatic transmission configured to automatically change gear ratios as the agricultural vehicle 10 traverses a field. For example, in certain embodiments, the automatic transmission may be a transmission manufactured by Allison Transmission, Inc. of Indianapolis, Ind. However, it should be appreciated that any suitable transmission may be utilized within the transmission system 52 in alternative embodiments.

Furthermore, the engine controller 46 is communicatively coupled to an engine 54, and configured to control operation of the engine 54. For example, the engine controller 46 may be configured to continuously regulate engine speed such that the engine 54 maintains a constant RPM. Alternatively, the engine controller 46 may be configured to continuously regulate engine torque such that the engine 54 maintains a constant torque. As will be appreciated, the engine 54 may be any suitable device (e.g., a diesel engine) configured to transfer torque to the transmission system 52. For example, in certain embodiments, the engine may be manufactured by Fiat Powertrain Technologies of Orbassano, Italy. In the illustrated embodiment, the engine 54 is coupled to the transmission system 52, and configured to transfer torque to the transmission system 52, thereby driving the wheels 22 to rotate.

During operation, the control system 12 will synchronize engine and transmission system operation to facilitate gear shifting while a constant RPM cruise control is activated. First, an operator may activate a constant RPM cruise control via the user interface 50. The vehicle controller 42 will then instruct the engine controller 46 to maintain the engine 54 at a constant RPM, such as between about 1800 to about 2300 RPM (e.g., based on the operator selection via the user interface 50). By way of example, the vehicle controller 42 will send a command to the engine controller to maintain the engine speed at approximately 2100 RPM. The engine controller 46 will then regulate engine speed to achieve the desired constant RPM.

When the transmission controller 44 determines that a gear shift is desired (e.g., during acceleration, deceleration, elevation change, etc.), the transmission controller 44 will instruct the transmission system 52 to shift gears (e.g., up shift or down shift). The transmission controller 44 will also send a signal to the vehicle controller 42 indicative of gear shift initiation. Once the vehicle controller 42 receives the signal indicative of gear shift initiation, the vehicle controller 42 will instruct the engine controller 46 to maintain the current torque (i.e., transition from a constant RPM cruise to a constant torque cruise). Consequently, the engine controller 46 will regulate engine torque to maintain the level present when the engine controller 46 received the instructions to enter the constant torque cruise. For example, if the engine torque was 85 percent of the total torque capacity when the engine controller 46 received the instructions from the vehicle controller 42, the engine controller 46 will maintain a torque of 85 percent of the total capacity, regardless of RPM.

Once the gear shift is complete, the transmission controller 44 will send a signal to the vehicle controller 42 indicative of gear shift completion. Upon receipt of the signal, the vehicle controller 42 will instruct the engine controller 46 to maintain the engine 54 at the originally desired constant speed (i.e., return to the constant RPM cruise). The temporary transition from the constant RPM cruise to the constant torque cruise during the gear shifting process enables the transmission system to effectively change gears without engine interference, thereby facilitating smooth up shifts and/or down shifts.

Figure 3:
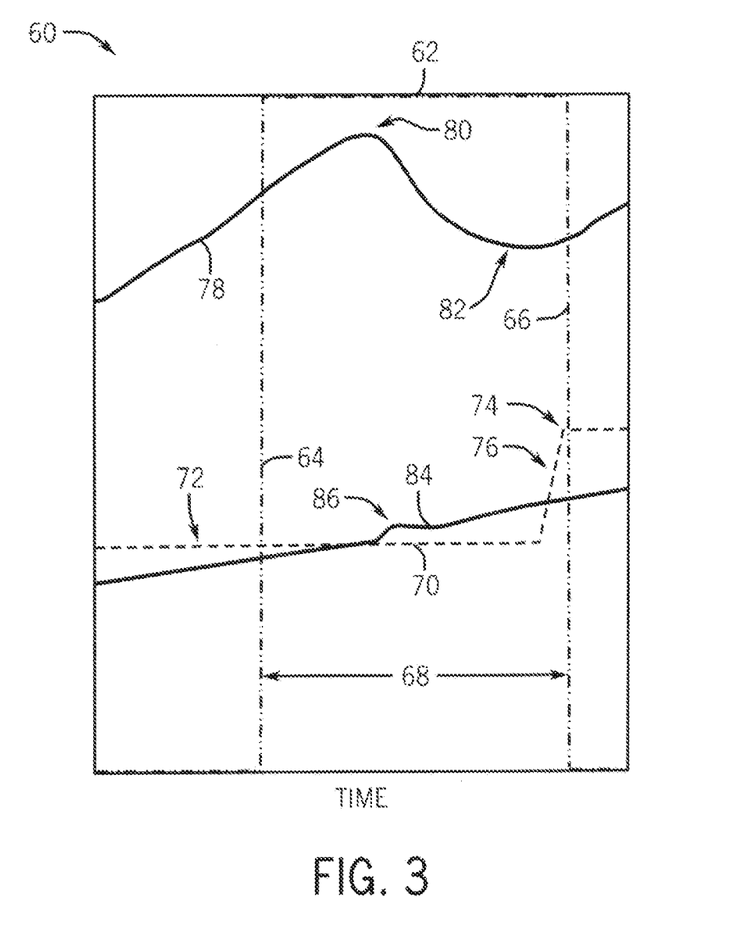
FIG. 3 is an exemplary graph of control parameters versus time for a transmission up shift.

FIG. 3 is an exemplary graph 60 of control parameters versus time for a transmission up shift. As illustrated, curve 62 represents a signal from the transmission controller 44 indicating that a gear shift is in progress. Specifically, segment 64 of curve 62 corresponds to gear shift initiation, and segment 66 of curve 62 corresponds to gear shift termination. Consequently, the duration 68 between gear shift initiation and gear shift termination represents the total time associated with shifting gears. For example, the shift duration 68 may be approximately 1.0 to 2.0 seconds. In certain embodiments, the shift duration 68 may be approximately 1.3 seconds. Curve 70 represents the current gear. As illustrated, a first segment 72 of curve 70 corresponds to a first gear at the start of the gear shift process, and a second segment 74 of curve 70 corresponds to a second gear at the end of the gear shift process. Segment 76 is representative of a transition between the first gear and the second gear, and illustrates a positive gear change (i.e., an up shift). For example, segment 72 may be representative of gear number 2, and segment 74 may be representative of gear number 3. However, it should be appreciated that the gear transition may be between any two consecutive gears within the transmission system.

Curve 78 represents engine speed as a function of time. As illustrated, the engine speed initially increases as the engine controller 46 raises engine RPM to reach a desired level. However, when the vehicle controller 42 receives a signal indicative of gear shift initiation (at a time corresponding to segment 64), the vehicle controller 42 instructs the engine controller 46 to maintain a constant torque rather than a constant RPM. While in the constant torque cruise, the engine speed increases to a local maxima 80, and then decreases to a local minima 82 before rising again. As will be appreciated, the decrease in engine speed is induced by the change in gear ratios. Once the gear shifting process is complete (at a time corresponding to segment 66), the vehicle controller 42 will instruct the engine controller 46 to return to the constant RPM cruise. Thus, by changing from engine speed control to torque control during the gear shifting process, the transmission system can effectively change gears without engine interference, thereby facilitating smooth up shifts.

Curve 84 represents a rotation speed of a transmission output shaft. In certain embodiments, the transmission output shaft is coupled to the vehicle wheels by one or more differentials and/or drive shafts. As illustrated, the transmission output shaft speed steadily increases before, during, and after the gear shift, with a temporary sharp increase at location 86. Thus, the ground speed of the vehicle steadily increases throughout the gear shifting process.

Figure 4:
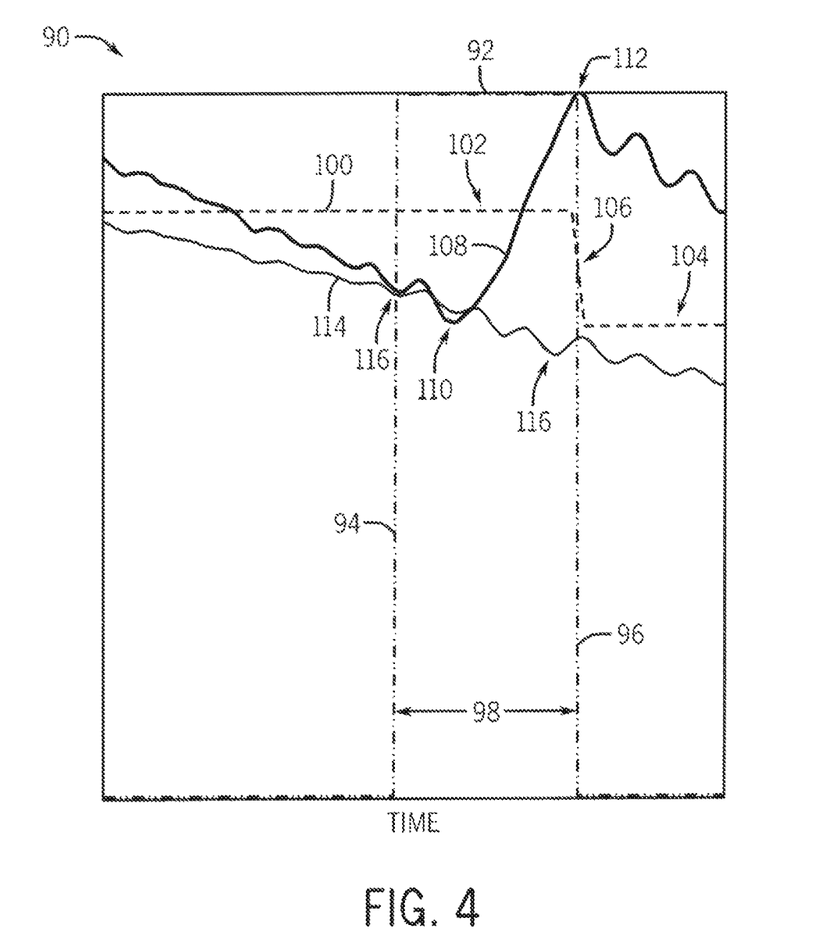
FIG. 4 is an exemplary graph of control parameters versus time for a transmission down shift.

FIG. 4 is an exemplary graph 90 of control parameters versus time for a transmission down shift. As illustrated, curve 92 represents a signal from the transmission controller 44 that a gear shift is in progress. Specifically, segment 94 of curve 92 corresponds to gear shift initiation, and segment 96 of curve 92 corresponds to gear shift termination. Consequently, the duration 98 between gear shift initiation and gear shift termination represents the total time associated with shifting gears. For example, the shift duration 98 may be approximately 1.0 to 2.0 seconds. In certain embodiments, the shift duration 98 may be approximately 1.1 seconds. Curve 100 represents the current gear. As illustrated, a first segment 102 of curve 70 corresponds to a first gear at the start of the gear shift process, and a second segment 104 of curve 100 corresponds to a second gear at the end of the gear shift process. Segment 106 is representative of a transition between the first gear and the second gear, and illustrates a negative gear change (i.e., a down shift). For example, segment 102 may be representative of gear number 5, and segment 104 may be representative of gear number 4. However, it should be appreciated that the gear transition may be between any two consecutive gears within the transmission system.

Curve 108 represents engine speed as a function of time. As illustrated, the engine speed initially decreases as the agricultural vehicle slows down, such as when the vehicle is under load and being lugged down. However, when the vehicle controller 42 receives a signal indicative of gear shift initiation (at a time corresponding to segment 94), the vehicle controller 42 instructs the engine controller 46 to maintain a constant torque rather than a constant RPM. While in the constant torque cruise, the engine speed decreases to a local minima 110, and then increases to a local maxima 112 before decreasing again. As will be appreciated, the increase in engine speed is induced by the change in gear ratios. Once the gear shifting process is complete (at a time corresponding to segment 96), the vehicle controller 42 will instruct the engine controller 46 to return to the constant RPM cruise. Thus, by changing from engine speed control to torque control during the gear shifting process, the transmission system can effectively change gears without engine interference, thereby facilitating smooth down shifts.

Curve 114 represents a rotation speed of a transmission output shaft. In certain embodiments, the transmission output shaft is coupled to the vehicle wheels by one or more differentials and/or drive shafts. As illustrated, the transmission output shaft speed steadily decreases before, during, and after the gear shift, with some oscillations at locations 116. Thus, the ground speed of the vehicle steadily decreases throughout the gear shifting process.

Figure 5:
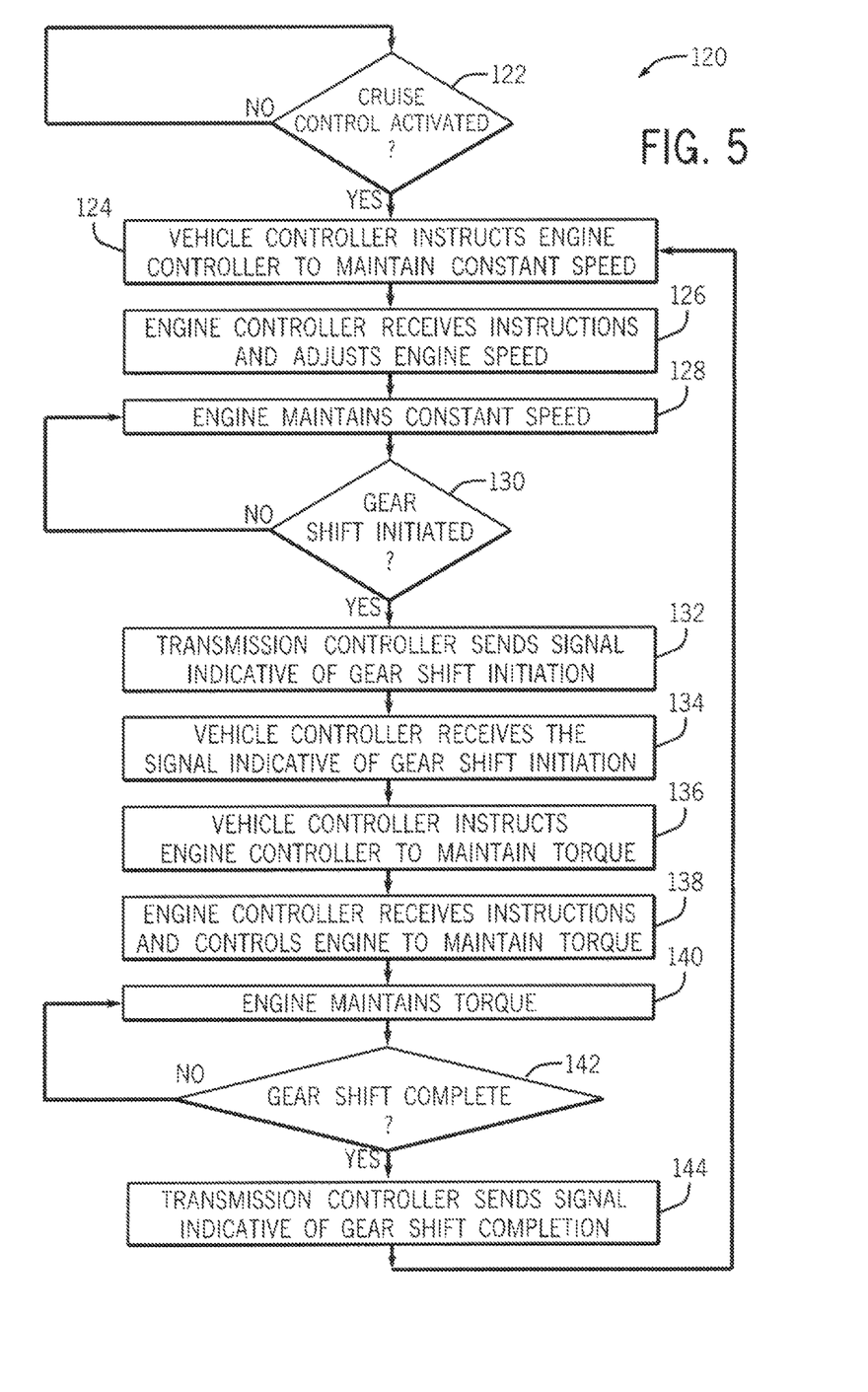
FIG. 5 is an embodiment of a method for synchronizing engine and transmission system operation.

FIG. 5 is an embodiment of a method 120 for synchronizing engine and transmission system operation. At step 122, a vehicle control system determines whether constant RPM cruise control is activated. For example, to activate the cruise control, an operator may select a desired engine speed via a user interface. If the cruise control is activated, a vehicle controller instructs an engine controller to maintain an engine at the selected constant speed (i.e., RPM), at step 124. For example, the vehicle controller may instruct the engine controller to maintain the engine at approximately 1800 to 2300 RPM. By way of example, the vehicle controller may instruct the engine controller to maintain the engine at approximately 2100 RPM. In certain embodiments, the constant engine speed may be a peak operating RPM of the engine. Next, at step 126, the engine controller receives the instructions from the vehicle controller and adjusts the engine speed. Then, at step 128, the engine maintains the desired constant speed.

At step 130, the control system determines whether a gear shift is initiated. In certain embodiments, the gear shift may be an up shift, or a down shift. However, in other embodiments, the control system may only proceed to step 132 when a down shift is initiated. If a gear shift initiated, the transmission controller sends a signal indicative of gear shift initiation to the vehicle controller, at step 132. Next, at step 134, the vehicle controller receives the signal indicative of gear shift initiation. Then, at step 136, the vehicle controller instructs the engine controller to maintain the current engine torque (i.e., the engine torque present when the instructions are received). For example, the vehicle controller may instruct the engine controller to maintain the current engine torque, such as a torque from 0 to 100 percent of engine capacity.

At step 138, the engine controller receives the instructions from the vehicle controller and controls the engine to maintain the desired constant torque. Next, at step 140, the engine maintains the desired constant torque. Then, at step 142, the control system determines whether the gear shift is complete. When the gear shift is complete, at step 144, the transmission controller sends a signal indicative of gear shift completion to the vehicle controller. Once complete, the method 120 returns to step 124 and performs steps 124 through 128. The method 120 maintains the engine at the desired constant speed per step 128 until another gear shift is initiated.

The temporary transition from the constant RPM cruise to the constant torque cruise during the gear shifting process enables the transmission system to effectively change gears without engine interference, thereby facilitating smooth up shifts and/or down shifts. As will be appreciated, fewer or more steps may be part of the method 120 for synchronizing engine and transmission system operation. Furthermore, in certain embodiments, the steps may be performed in a different order than described above. Likewise, in other embodiments, the functions of the vehicle controller, engine controller, and/or transmission controller may be performed by fewer or more than three controllers. In addition, the steps of method 120 may be performed using software, hardware, or a combination of software and hardware.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for synchronizing engine and transmission system operation within an agricultural vehicle, comprising:
   instructing, via a vehicle controller having a processor and a memory device, an engine controller to maintain an engine at a constant speed;
   receiving, via the vehicle controller, a first signal from a transmission controller indicative of gear shift initiation;
   instructing, via the vehicle controller, the engine controller to maintain the engine at a current torque upon receipt of the first signal;
   receiving, via the vehicle controller, a second signal from the transmission controller indicative of gear shift completion; and
   instructing, via the vehicle controller, the engine controller to maintain the engine at the constant speed upon receipt of the second signal.

2. The method of claim 1, wherein the first signal and the second signal are received via a communication system.

3. The method of claim 1, wherein the constant speed comprises approximately 2100 rotations per minute.

4. The method of claim 1, wherein instructing, via the vehicle controller, the engine controller to maintain the engine at the constant speed, and instructing, via the vehicle controller, the engine controller to maintain the engine at the current torque comprises sending respective signals from the vehicle controller to the engine controller.

5. The method of claim 1, wherein the transmission controller is configured to send the first signal upon initiation of an up shift.

6. The method of claim 1, wherein the transmission controller is configured to send the first signal upon initiation of a down shift.

7. An electronic control system for an agricultural vehicle comprising:
   a vehicle controller comprising a processor and a memory device, wherein the vehicle controller in operation performs a method comprising:
   instructing an engine controller to maintain an engine at a constant speed;
   receiving a first signal from a transmission controller indicative of gear shift initiation;
   instructing the engine controller to maintain the engine at a current torque upon receipt of the first signal;
   receiving a second signal from the transmission controller indicative of gear shift completion; and
   instructing the engine controller to maintain the engine at the constant speed upon receipt of the second signal.

8. The electronic control system of claim 7, wherein the first signal and the second signal are received via a communication system.

9. The electronic control system of claim 7, wherein the constant speed comprises approximately 2100 rotations per minute.

10. The electronic control system of claim 7, wherein instructing the engine controller to maintain the engine at the constant speed, and instructing the engine controller to maintain the engine at the current torque comprises sending respective signals to the engine controller.

11. The electronic control system of claim 7, wherein the transmission controller is configured to send the first signal upon initiation of an up shift.

12. The electronic control system of claim 7, wherein the transmission controller is configured to send the first signal upon initiation of a down shift.

13. A method for synchronizing engine and transmission system operation within an agricultural vehicle, comprising:
   instructing, via a vehicle controller having a processor and a memory device, an engine controller to maintain an engine at a constant speed;
   instructing, via the vehicle controller, the engine controller to maintain the engine at a current torque upon receipt of a first signal indicative of gear shift initiation; and
   instructing, via the vehicle controller, the engine controller to maintain the engine at the constant speed upon receipt of a second signal indicative of gear shift completion.

14. The method of claim 13, wherein the first signal and the second signal are received via a communication system.

15. The method of claim 13, wherein the constant speed comprises approximately 2100 rotations per minute.

16. The method of claim 13, wherein instructing, via the vehicle controller, the engine controller to maintain the engine at the constant speed, and instructing, via the vehicle controller, the engine controller to maintain the engine at the current torque comprises sending respective signals from the vehicle controller to the engine controller.

17. The method of claim 13, wherein a transmission controller is configured to send the first signal upon initiation of an up shift.

18. The method of claim 13, wherein a transmission controller is configured to send the first signal upon initiation of a down shift.

19. The method of claim 13, wherein the transmission system comprises an automatic transmission configured to automatically change gears.

20. The method of claim 13, wherein the constant speed comprises a peak operating speed.

* * * * *